Oct. 21, 1969   J. W. KELLER, JR   3,474,353

MULTIVIBRATOR HAVING PULSE RATE RESPONSIVE TO BATTERY VOLTAGE

Filed Jan. 4, 1968

INVENTOR.
JOHN WALTER KELLER

BY

Kenway, Jenney & Hildreth

ATTORNEYS

United States Patent Office 3,474,353
Patented Oct. 21, 1969

3,474,353
MULTIVIBRATOR HAVING PULSE RATE RESPONSIVE TO BATTERY VOLTAGE
John W. Keller, Jr., Miami, Fla., assignor to Cordis Corporation, Miami, Fla., a corporation of Florida
Filed Jan. 4, 1968, Ser. No. 695,623
Int. Cl. H03k 3/28
U.S. Cl. 331—113                                    4 Claims

ABSTRACT OF THE DISCLOSURE

In a pulse generating circuit, such as in an implantable battery-powered cardiac pacemaker, a Zener diode is connected in the charging path of the capacitance and resistance components which determine the time interval between pulses. As the potential of the batteries powering the circuit decreases, the Zener diode functions to proportionally increase the amount of time it takes for the capacitor to charge.

---

This invention relates generally to pulse generating circuits such as used in cardiac pacemakers and provides an implantable pacemaker with a repetition rate which varies with the voltage of the battery powering the pacer. Accordingly, the slowing down of the pulse rate warns a patient that the battery is worn out or defective.

In the human body, blood is pumped primarily by the contractions of the ventricles of the heart which are trigggered by electrical signals originating in the atrium. One form of heart trouble is caused by psysiological conditions which weaken or eliminate these signals. In order to remedy this situation, cardiac pacemakers have been designed to stimulate the contraction of the ventricles with electrical pulses. These pacemarkers are implanted in the body of a patient along with batteries for powering the pacemaker and electrical leads attached to the ventricles.

A pacemaker circuit which has been highly successful utilizes a multivibrator that provides pulses at a constant rate regardless of the state of the batteries. As the batteries steadily wear down, the pulse rate of the pacemaker remains constant.

Presently the batteries best suited for powering cardiac pacemakers maintain a substantially constant voltage throughout their lives and then suddenly run down. It has therefore become desirable to have some indicator of the battery voltage. The pacemaker of this invention provides a pulse generating circuit in which the pulse interval increases (the pulse rate decreases) as the battery voltage drops. When this pacemaker is used in combination with the batteries described above, the pulse rate remains constant over the useful life of the batteries and then decreases in the critical period of rapid decline in battery voltage. The pulse rate of the patient is an especially advantageous indicator of the state of the batteries since it is easily checked by the patient himself without the use of elaborate equipment.

The pacemaker of this invention consists essentially of a free-running multivibrator circuit in which a Zener diode is connected in the charging path of the capacitor in the RC circuit which determines the length of time between pulses. As the battery powering the pacemaker wears down, the Zener diode functions to increase the time interval between pulses.

The operation of the Zener diode can be best understood from the following detailed analysis of an old, fixed-rate pacemaker circuit and a pacemaker circuit employing a Zener diode. Reference is made to the accompanying drawings in which.

Figure 1:
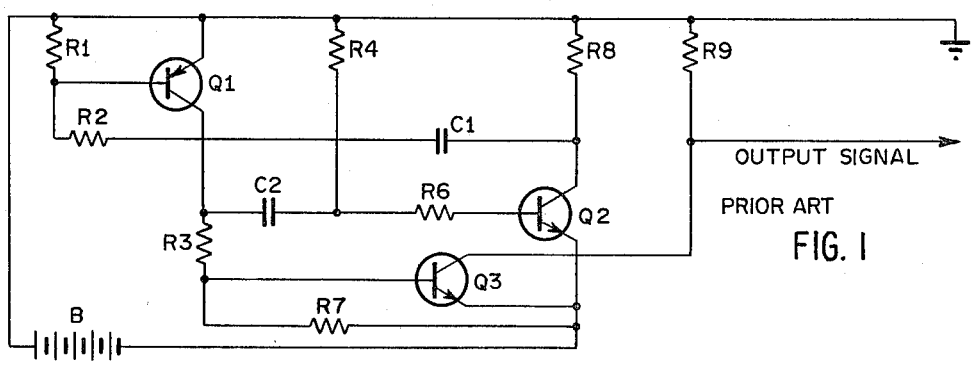
FIG. 1 is a schematic diagram of a pacemaker having a pulse rate which is independent of the battery voltage.

The invention will be more easily understood if reference is first made to the older pacemaker circuit shown in FIG. 1 which operates at a rate which is independent of the battery voltage. In essence, the circuit consists of a free-running (astable) multivibrator employing a pair of transistors which are of complementary conductivity types, that is, the transistor Q1 is PNP while transistor Q2 is NPN, and an amplifying transistor Q3. There is an output pulse while both the transistors Q1 and Q2 of the multivibrator are conducting. To simplify the analysis of the multivibrator circuit, assume that transistor Q2 has been cut off and is just beginning to conduct. The collector potential of Q2 which has been at ground drops since it is now conducting through R8 which is a 100K resistor. If the battery is fully charged (approximately −6.5 volts), the collector potential is near −6.0 volts. The sudden 6.0 volt drop at the collector of transistor Q2 is coupled through capacitor C1 to the base of transistor Q1 causing it to turn on. Transistor Q1 remains turned on until capacitor C1 charges through resistor R2 and the base-emitter circuit of transistor Q1. This time constant is fairly short, but the base of transistor Q1 remains sufficiently negative for approximately 2 milliseconds.

When transistor Q1 conducts, the voltage at its collector rises sharply from −6.5 volts because of the current flowing through the resistors R3 and R7. This sudden rise in voltage is coupled through the capacitor C2 to the junction of the capacitor C2 and the resistor R6. Capacitor C2 charges to about 6.0 volts during the "ON" time of the transistors Q1 and Q2. Under these circumstances, when the transistor Q1 cuts off and its collector voltage drops from −0.5 volt to the battery potential of −6.5 volts, this sudden 6.0 volt drop is coupled through the capacitor C2 causing the potential on the right hand side of capacitor C2 to fall from −6.0 volts to approximately −12.5 volts. Since the potential on the base of transistor Q2 must be slightly more positive than the battery potential, which is applied directly to the emitter, the sudden drop to −12.5 volts cuts off transistor Q2. The transistor Q2 remains cut off until capacitor C2 discharges through the resistor to the "trigger" potential (−6.0 volts) which fires transistor Q2. The interval between pulses is therefore determined by the time it takes for the capacitor C2 to charge to the trigger potential through R4, R3 and R7.

Figure 2:
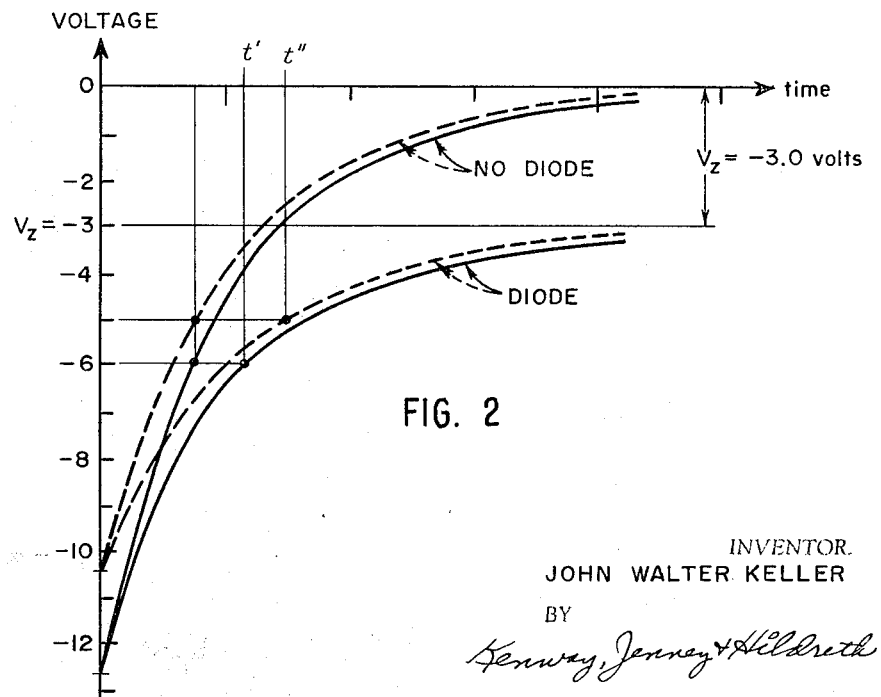
FIG. 2 is a graph showing the effect of the Zener diode on the time curve of the capacitor in the RC circuit which controls the pulse interval.

The circuit described above is characterized by the fact that as the battery voltage drops, the firing threshold at which transistor Q2 conducts also drops. This relationship causes the pulse rate of the circuit to remain constant as the battery potential decreases. To better understand that the pulse rate is constant, consider the action of the circuit when the battery potential has worn down 1.0 volt to −5.5 volts. When the battery is fresh, the capacitor C2 begins charging from −12.5 volts towards zero potential until transistor Q2 fires at −6.0 volts. This is illustrated in FIG. 2 by the solid curve labeled NO DIODE. When the battery has worn down to −5.5 volts, the capacitor C2 begins charging from −10.5 volts towards zero potential until transistor Q2 fires at −5.0 volts. This is illustrated in FIG. 2 by the dashed curve labeled NO DIODE. In both instances the trigger potential is approximately 50% of the initial potential. Since the potential V on a charging capacitor at a time $t$ is given by (1) $$V = V_f(1 - e^{-t/T})$$

where $V_f$=the fully charged potential of the capacitor, and $t/T=RC$, the time constant of the charging circuit, the same time $t$ will be required to reach $V/V_f=50\%$ for any given RC combination regardless of changes in the initial potential on the capacitor. In other words, as long as the trigger potential remains 50% of the total travel voltage, the time required for the capacitor C2 to charge to the trigger potential will remain constant.

Figure 3:
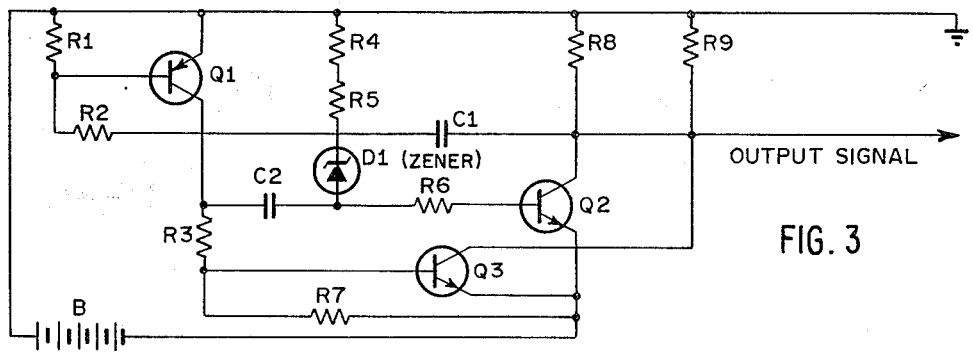
FIG. 3 is a schematic diagram of a pacemaker employing a Zener diode to make the pulse rate a function of the battery voltage.

The Zener diode D which is incorporated in the circuits of this invention destroys the 50% relationship which characterizes the circuit as shown in FIG. 1. With a Zener diode D in the charging circuit of the capacitor C2, as shown in FIG. 3, the trigger potential which fires the transistor Q2 becomes a different percentage of the total travel voltage as the battery potential decreases. Accordingly, the time for the capacitor C2 to charge to the trigger potential, and hence the pulse interval, varies with the battery potential.

The 50% relationship is destroyed because the Zener D is a non-linear voltage-dropping element and provides a potential drop Vz which opposes the potential of the actual battery B. When the circuit is operating, the capacitor charges "towards" the breakdown potential of the Zener diode D rather than towards ground potential. In other words, the charging current applied to the capacitor varies as a non-linear function of battery voltage. This is represented graphically in FIG. 2 by the solid and dashed curves labeled DIODE which level off at −3.0 volts (a typical value for the Zener breakdown potential). A change in the pulse rate is shown graphically by the time shift from $t'$ to $t''$ where $t'$ and $t''$ are the times for C2 to charge to the trigger potentials of −6.0 volts and −5.0 volts, respectively. The solid curve labeled DIODE corresponds to the fresh battery condition; the dashed curve labeled DIODE corresponds to the situation when the battery has worn down to 1.0 volt.

The action of the diode D can also be viewed mathematically by comparing the voltage through which the capacitor C2 must travel in order to reach the trigger potential to the total travel voltage. These calculations are recorded in Table I. The voltage figures for the DIODE condition are calculated as follows: when the battery is fresh, the capacitor C2 charges from −12.5 volts to −3.0 volts yielding a total travel voltage of 9.5 volts, the potential traveled to trigger the circuit is −12.5 volts minus (−6.0 volts) which is 6.5 volts, and the ratio of $V/V_f$ is then 6.5/9.5=68.5%. When the battery is worn down 1.0 volt, the capacitor C2 charges from −10.5 volts to −3.0 volts yielding a total travel voltage of 7.5 volts, the potential traveled to trigger the circuit is −10.5 volts minus (−5.0 volts) which is 5.5 volts, and the ratio of $V/V_f$ is then 5.5/7.5=73.4%. If a Zener diode with a different breakdown potential $V_z$ is used, these calculations will of course yield different voltage values and different ratios.

The $V/V_f$ ratio for the NO DIODE situation changes from 52.0% to 52.3%. This is a more accurate statement of the "50% relationship." In contrast, with the Zener diode in the circuit a 1.0 volt diminution in the battery voltage changes the ratio from 68.5% to 73.4%. Referring to Equation 1, the corresponding change in $t/T$ is from 1.2 to 1.35, or 15 parts to 120. Assuming that the circuit components are chosen so that the pulse rate is 50 pulses per minute when the battery is fresh and the diode is in the circuit, this change in battery voltage will result in a pulse rate of 44.5 pulses per minute.

TABLE I

|  | Voltage at t₀, volts | Trigger | Difference | Difference/Total | t/RC corresponding to Diff./Total | Pulse rate |
| --- | --- | --- | --- | --- | --- | --- |
| Battery voltage at −6.5 volts: |  |  |  |  |  |  |
| No Diode | −12.5 | −6.0 | −6.5 | .520 | 0.73 | *82 |
| Diode | −9.5 | −3.0 | −6.5 | .685 | 1.2 | 50 |
| Battery voltage at −5.5 volts: |  |  |  |  |  |  |
| No Diode | −10.5 | −5.0 | −5.5 | .523 | 0.73 | 82 |
| Diode | −7.5 | −2.0 | −5.5 | .734 | 1.35 | 44.5 |

*The pulse rate at a given battery potential is determined initially by the choice of the circuit components, and particularly the capacitors and resistors which determine the pulse interval.

The functions of the remaining components of the circuits shown in FIGS. 1 and 3 are easily explained. The resistors R1 and R7 provide the proper bias to the bases of the transistors Q1 and Q3 respectively. Resistor R3 provides the collector bias to Q1 and also determines the maximum output current available from Q3. The pulse duration is controlled by resistor R2. The pulse interval is controlled by the resistors R4 and R5 which provide both a coarse and fine adjustment. Resistor R6 prevents capacitor C2 from charging too fast during the "ON" time of the transistors Q1 and Q2. The resistor R9 is the load resistor for the amplifying transistor Q3.

While the invention has been described with particular reference to use in a fixed-rate pacemaker, it will be obvious that many other uses and modifications may be made by those skilled in the art without departing from the scope of my invention. In particular, the invention may be employed in other types of pacemakers besides the fixed-rate pacemaker and in other pulse generating devices where it is desired to determine the state of the power supply from the rate of operation of the device.

Having thus disclosed my invention, I claim:

1. An implantable pacer for stimulating a patient's heart at timed intervals, said pacer comprising:
    a battery;
    a pair of transistors;
    at least one timing capacitor;
    circuit means interconnecting said transistors and said capacitor in a multivibrator circuit which is energized from said battery and which has an operating cycle the duration of at least one portion of which is determined by the rate of charging of said capacitor;
    a charging circuit including a non-linear voltage-dropping element for providing to said capacitor a charging current which varies as a non-linear function of the voltage of said battery whereby the rate of stimulation provided by said pacer varies substantially as a function of said battery voltage.

2. An implantable pacer as set forth in claim 1 wherein said transistors are of complementary conductivity types.

3. An implantable pacer as set forth in claim 1 wherein said non-linear voltage-dropping element is a Zener diode.

4. An implantable pacer as set forth in claim 1 wherein said capacitor couples the collector of one of said transistors to the base of the other of said transistors.

References Cited
UNITED STATES PATENTS

| | | | |
|---|---|---|---|
| 2,956,241 | 10/1960 | Huang | 331—113 |
| 3,241,087 | 3/1966 | Gossel | 331—113 |

ROY LAKE, Primary Examiner

SIEGFRIED H. GRIMM, Assistant Examiner

U.S. Cl. X.R.

128—422; 331—177